(12) United States Patent
Kotzsch

(10) Patent No.: US 8,705,649 B2
(45) Date of Patent: Apr. 22, 2014

(54) METHOD AND RECEIVER STRUCTURE FOR INTERFERENCE CANCELLATION IN CO-ORDINATED MULTIPOINT SYSTEMS

(75) Inventor: Vincent Kotzsch, Dresden (DE)

(73) Assignee: Vodafone Holding GmbH, Düsseldorf (DE)

( * ) Notice: Subject to any disclaimer, the term of this patent is extended or adjusted under 35 U.S.C. 154(b) by 47 days.

(21) Appl. No.: 13/560,326

(22) Filed: Jul. 27, 2012

(65) Prior Publication Data

US 2014/0010334 A1  Jan. 9, 2014

(30) Foreign Application Priority Data

Jul. 27, 2011 (EP) .................................. 11175673

(51) Int. Cl.
*H04L 7/02* (2006.01)
*H04B 1/10* (2006.01)

(52) U.S. Cl.
USPC ............................................ 375/267; 375/350

(58) Field of Classification Search
USPC .................... 375/260, 267, 347, 350
See application file for complete search history.

(56) References Cited

U.S. PATENT DOCUMENTS

2009/0110033 A1\* 4/2009 Shattil ........................... 375/141
2012/0106428 A1\* 5/2012 Schlicht et al. ............... 370/312

\* cited by examiner

*Primary Examiner* — Don N Vo
(74) *Attorney, Agent, or Firm* — Edwards Wildman Palmer LLP; Peter F. Corless

(57) ABSTRACT

A coordinated multipoint OFDM system comprising a plurality of receiving base stations, each comprising a plurality of antennas, is described. Each base station determines and forwards interferences for each received symbol and passes the information to a central processing entity for jointly processing the signals.

14 Claims, 3 Drawing Sheets

Figure 1:
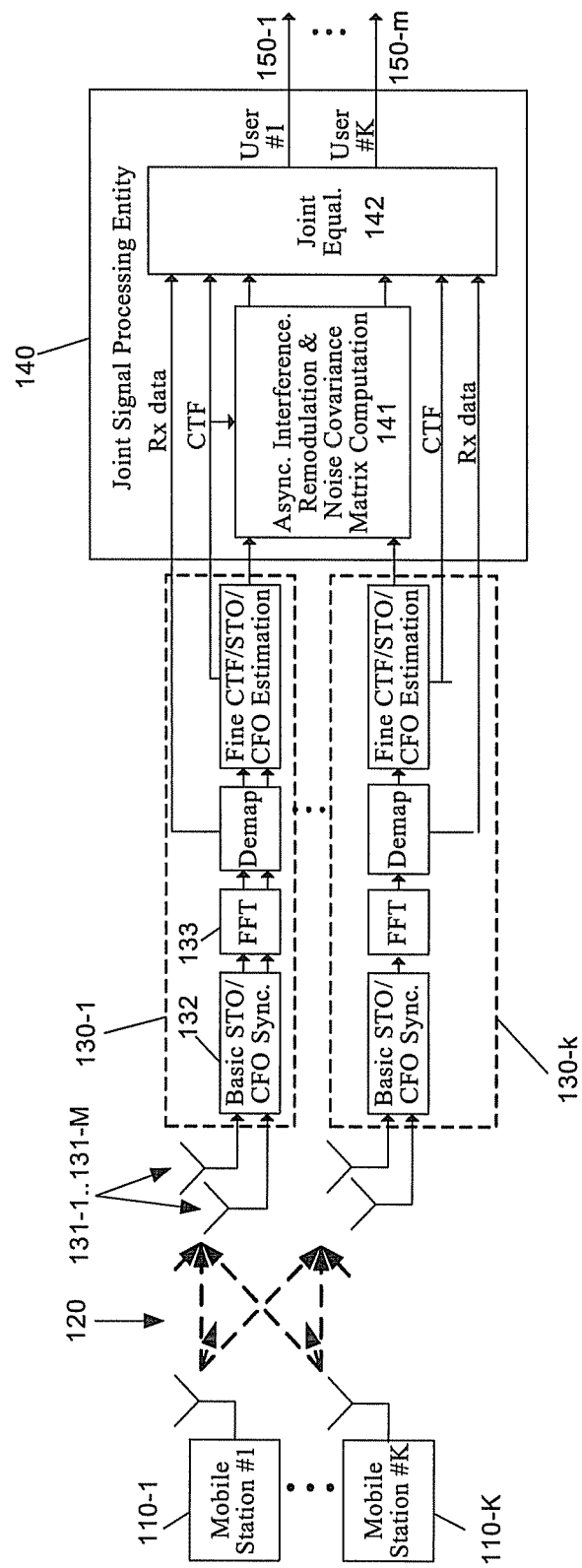

METHOD AND RECEIVER STRUCTURE FOR INTERFERENCE CANCELLATION IN CO-ORDINATED MULTIPOINT SYSTEMS

CROSS-REFERENCES TO RELATED APPLICATIONS

This application claims under 35 U.S.C. §119(a) the benefit of European Patent Application No. 11175673.0-1246 filed Jul. 27, 2011 the entire contents of which is incorporated herein by reference.

The invention relates to a method and a corresponding receiver structure for cancelling interference comprised in a receive signal.

In cellular communication systems, for example as described in the LTE specification, an available radio resource typically is divided into a grid of resource units, wherein an available radio frequency range is split into a plurality of adjacent frequency bands. Each frequency band is divided into small time units, i.e. so-called time slots, and a time-slot of one frequency band is called a resource unit. A resource unit can be used for transmitting a burst of symbols either from a mobile station to an access station of the communication system, i.e. uplink, or downlink, i.e. from an access point of the network to a mobile station. Note that in the following description the term resource unit is used only to identify a time slot or a resource grid.

In all conventional cellular communication systems radio resources are allotted by the network system to the plurality terminals located in a cell to enable a simultaneous communication, i.e. exchange of data, of a plurality of mobile stations. Since all data in the cell are exchanged via access points, i.e. a base station or an eNodeB in LTE terms, the usage of resources must be coordinated in order to avoid interferences. Hence, the allocation of radio resources is coordinated by the network of the communication.

Adjacent resource units can be assigned to different terminals in order to use an allotted resource unit efficiently and to avoid interferences between bursts transmitted in adjacent resource units, each burst should fit into the assigned resource unit as exactly as possible in time and frequency. To mitigate interferences caused by offsets in time or frequency, a transmitter should start and end a transmission within the assigned resource unit, i.e. the transmitter should start at a point in time ensuring that a transmitted burst completely arrives at the receiver exactly in the allotted resource unit, within the allocated time span and within the allocated frequency band.

To meet these requirements terminals transmitting data bursts to and/or receiving data bursts from a base station of cell generally are synchronized with the clocking of the base station. Coarse synchronization information is broadcasted by the base station using a so-called synchronization channel.

In conventional systems, i.e. for example according to the LTE specifications, so-called timing advance information can be provided from the base station to a terminal that fine tunes the timing of transmissions from the terminal to the base stations. The base station uses uplink signals, i.e. data burst transmitted from the terminal to the base station, to calculate the timing advance information, which adjust when the terminal shall send the next uplink bursts. Timing advance information for example takes propagation delays into account, i.e. the time span that a radio wave needs to travel from the transmitting antenna to the receiving antenna. In this way, i.e. by synchronizing to the timing of the base stations clocking and fine tuning in time, timing offsets can be mitigated when a terminal transmits to and receives bursts from a single base station antenna.

However, in coordinated multi-point systems clusters of base stations, i.e. at least two base stations, are capable to cooperate. The base stations are locally distributed, but coupled via a backhaul link and thus can cooperate the transmission and reception to and from a terminal. A terminal can be communicatively coupled to more than one base station and at the same time transmit to or receive bursts from two or more cooperating base stations. However, the terminal can be synchronized to only one base station. More generally a receiver can be synchronized in time to only one transmitter, wherein the receiver can be a mobile terminal or a base station and the transmitter can be a base station or a mobile terminal respectively. This leads to time differences of a symbol arriving at different antennas, so-called time differences of arrival (TDOA), at least caused by different distances between the antennas. These time differences, at least when discretized and with respect to the sampling interval, equal to the known symbol timing offsets (STO).

In OFDM based systems, a cyclic prefix (CP), i.e. a cyclic extension added to each symbol before transmission, is used to avoid inter-OFDM-symbol interference (ISI) and to ensure the circularity of the channel coupling matrix in time. Inter-symbol interference is caused by OFDM symbols overlapping in time at a receiver, which is caused by insufficient timing alignment of the expected frame timing at the receiver with respect to the transmit timing. This can be for example caused by time differences of arrival, i.e. symbols do not exactly fit into the resource grid of the receiving base station. The cyclic prefix does not convey payload data. Accordingly, if symbols overlap in time at the receiver, this can be tolerated as long as the cyclic prefix is affected only. However, considering that there may be comparatively long distance differences from a transmitting mobile station to numerous antenna sites, where it is not possible to align the terminal to all sites in time, time differences of arrival may exceed the duration of a cyclic prefix thus causing inter symbol interference.

Using longer cyclic prefixes to increase the tolerance of symbols overlapping in time is a costly solution, since a longer cyclic prefix reduces the amount of payload data conveyed and in this way causes capacity loss.

Another problem is interference caused by carrier frequency offsets (CFO), i.e. differences between the actual carrier frequency at which the signal is transmitted and adjacent carrier frequencies at which symbols transmitted from other transmitters are actually transmitted, so that the signals received at a base station are not fully orthogonal and overlap in frequency. These interferences between adjacent channels are known as inter channel interference. Since the carrier frequency of an uplink burst is defined by the local oscillator in the mobile station, the quality of the oscillator directly has impact on the quality of the transmitted signal. This in particular may become a problem in regions with high signal to noise power ratio (SNR).

Accordingly there is a need for improving a receiver capable of handling signals received via multiple antennas with enhanced interference reduction.

Figure 2A:
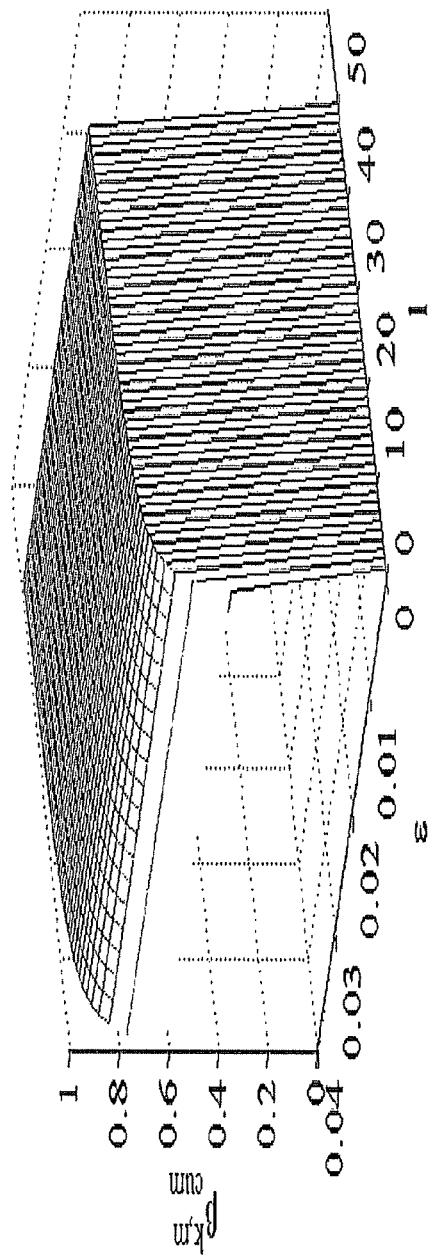
Figure 3A:
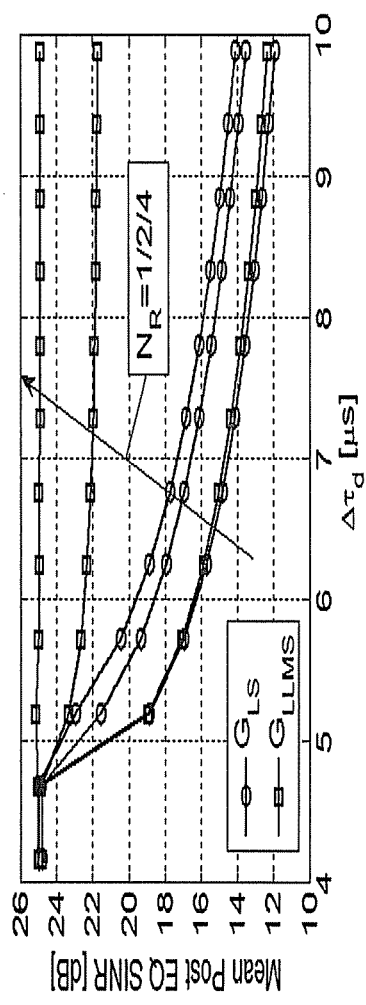

In the following the invention is described in more detail with respect to the following figures, wherein FIG. 1 depicts a schematic of the OFDM radio communication system;

FIGS. 2a,b depict simulation results showing cumulative inter channel interference;

FIGS. 3a,b depict performance simulations of the described system.

FIG. 1 depicts a schematic of a radio communication system 100 comprising a plurality of mobile stations transmitting signals to a plurality of receive stations. A chain of processing blocks is coupled to each receive chain, which in turn is coupled to a joint processing entity that estimates the information transmitted from each mobile station.

A plurality of mobile stations 110-1 ... 110-K, the plurality of mobile stations in the following jointly denoted 110, may simultaneously transmit information via radio links. The term mobile station in the following shall denote any station coupled via a radio link 120 to at least one receive station, which in turn is coupled to the network side of radio communication system 100. In one embodiment a mobile station may be a cell phone or a so-called personal digital assistant, i.e. a PDA, or a so-called smart phone or any other device capable of exchanging information via the radio communication system using the radio transmission protocol defined by the radio communication system. Accordingly the invention may not be limited to a particular type of mobile station.

Mobile stations 110-1 ... 110-K use the same resource units, i.e. they use the same frequency at the same time, each mobile station using a single antenna.

Dashed arrows 120 indicate radio links of the plurality of mobile stations to the plurality of receive stations 130-1 ... 130-k; wherein the joint plurality of stations 130-1 ... 130-k in the following is denoted 130. As indicated by the arrows a radio signal transmitted by one of the plurality of mobile stations 110 is received by at least two receive stations 130, wherein each receive station comprises at least two antennas 131 for receiving the signals. Accordingly each antenna 131 of a receive station 130 receives a receive signal, wherein each receive signal is a superposition of radio signals from a plurality of mobile stations, and wherein the radio signals of the mobile stations are furthermore superimposed by noise.

Communication system 100 comprises at least two base stations 130-1 ... 130-k, which pass the received and processed signals to a joint processing entity 140. Joint signal processing entity 140 receives these signals from the connected base stations, computes a noise covariance matrix and performs based on said matrix at least a joint equalization of the receive signals and outputs equalized receive signals 150-1 ... 150-m.

A base station may comprise a plurality of processing blocks for processing the at least two receive signals. Each base station processes the receive signals and passes the processed receive signals to a joint signal processing entity 140. Note that the processing blocks of the processing chain may be comprised in a base station or may be comprised in the joint signal processing entity or may be distributed arbitrarily over a plurality of processing entities arranged between the joint signal processing entity and the plurality of receiving antennas 131. The distribution and arrangement of processing blocks depicted in the figure accordingly describes one embodiment of an arrangement of processing blocks, but is not limiting.

Since processing in the chain of processing blocks of each base station can be considered identical, the processing of the receive signals in the following is described with respect to one base station.

Note that the term base station in this description is used as the generic term for an access station of the communication system providing the radio interface for the mobile stations, which in GSM terms is called a base station or in LTE terms an eNodeB. Accordingly a base station may comprise antennas for receiving radio signals from mobile stations or may be communicatively connected to antennas, i.e. so-called remote radio heads.

In the chain of processing blocks the at least two receive signals may be passed to a symbol timing offset and carrier frequency offset synchronization block 132. Said block 132 performs a basic symbol timing offset synchronization and a basic carrier frequency offset synchronization of the two receive signals in order to roughly match the receive signals to the timing of the base station. Optionally the signals received by the at east two antennas may be amplified for example by a low noise amplifier prior to being passed to the basic symbol timing offset and carrier frequency offset synchronization block. Also the receive signals may be sampled to produce a digital signal, so that a digital representation of the antenna signal is fed into block 132 and the processing can be performed with digitized signals.

Processing block 132 is coupled to a Fast Fourier Transformation (FFT) block 133 and provides the roughly synchronized receive signals, i.e. at least two receive signals, to block 133. FFT block 133 performs a Fast Fourier Transformation on each provided receive signal to produce corresponding receive signals in the frequency domain.

The receive signals in frequency domain representation are passed to de-mapper block 134, which performs a de-mapping of the passed receive signals, i.e. de-mapper 134 splits each receive signal into payload data and protocol data of that receive signal. The payload data signal portion of each receive signal, in the figure denoted Rx data, is passed to joint equalizer 142, whereas the protocol data portion of each receive signal is passed to block 135. In the following the payload data portion of the receive signal is denoted as vector Y.

Block 135 estimates a channel transfer function (CTF), i.e. the channel taps, for each channel connecting a mobile station 110-1 ... 110-K to each antenna 131, each antenna of that base station, based on the provided protocol data portions of the at least two receive signals. The estimated channel tap values of all channels are passed to joint signal processing entity 140, particularly to block 141 and to block 142. Furthermore block 135 estimates the symbol timing offset and the carrier frequency offset of each receive signal based on the provided protocol data portions. The symbol timing offset estimates and the carrier frequency offset estimates are passed to block 141.

In this way each base station 130 provides the payload data portion of each receive signal received by an antenna of said respective base station to joint signal processing entity 140. Additionally each base station provides channel transfer functions, i.e. CTFs, of the channels of each receive signal as well as respective symbol timing estimates and carrier frequency offset estimates to joint signal processing entity 140. To provide the data from each base station to the joint signal processing entity 140, each base station is coupled via a backhaul link to the entity 140.

In the joint signal processing entity the estimates of the channel transfer functions are provided to both blocks 141 and 142 comprised in 140, whereas the symbol timing offsets and carrier frequency offsets are passed to block 141 only.

Based on the provided values block 141 computes a linear filter matrix, which is passed to joint equalization block 142. Joint equalization block applies a linear filtering on the forwarded payload data signal portion of a receive signal to estimate at least one of the plurality of K symbols transmitted in the same time slot from the plurality of K mobile stations 110-1-110-K. In one embodiment the filter applied to the receive signal can be a minimum mean-square error filter. Alternatively a so-called zero-forcing filter can be applied. The processing as described above with reference to FIG. 1 and particularly in block 141 is performed digitally and based on the following linear transmission model as described in the following.

As described above the available frequency resource, that is a frequency range, is divided into a number of Q subcarriers, wherein the subcarriers are used as in an OFDM system.

A plurality of K mobile stations, each using a single antenna, and a plurality of $M_R$ base stations is assumed, wherein each base m station is equipped with a number of $N_R$ receive antennas. Since we assume that each signal transmitted by a mobile station is received at each antenna of each base station, a plurality of $M=N_R M_R$ observations of the K transmit signals are received, wherein all mobile stations transmit on the same time and frequency resource, i.e. all mobile stations operate on the same subcarrier of the OFDM system and transmit in the same time slot, i.e. the mobile stations use the same resource units.

One OFDM symbol block, which is sampled at Nyquist rate having a sampling interval of $T_S$, consists of $N_B=Q+N_{CP}$ samples, where $N_{CP}$ defines the cyclic prefix length in terms of samples.

For each of the radio links 120 a specific discrete-time channel impulse response $h^{k,m}$, i.e. a channel transfer function CTF, of length L is estimated, wherein the power corresponding to a channel tap 1 is given by a power delay profile. The transfer function associated with a radio link is accordingly given as $H^{k,m}=DFT\{h^{k,m}\}$, sampled for each radio link at the subcarrier frequencies q, wherein DFT denotes the discrete Fourier transformation and $H^{k,m}$ accordingly is the channel transfer function in the frequency domain. It is assumed that each channel, i.e. each radio link, remains constant for at least two OFDM symbols assuming the channel coherence time to be larger than twice the OFDM symbol duration.

A complex transmit symbol of a user k on subcarrier g in OFDM symbol o is given by $X_{o,q}^k$, wherein we assume the symbols to be distributed uniformly and with unit power from an alphabet A of cardinality |A|. This assumption leads to a linear transmission model in the frequency domain without synchronization errors and corresponds to a conventional transmission model for spatial multiplexing, wherein a symbol received at antenna m can be written as $$Y_{o,q}^m = \sum_{k=1}^{K} H_q^{m,k} X_{o,q}^k + V_{o,q}^m, \quad (1)$$

wherein $H_q^{m,k}$ is the q-th entry of $H^{m,k}$ and $V_{o,q}^m$ denotes the average white Gaussian noise AWGN with variance $\sigma_V^2$.

In contrast to that conventional linear transmission model the impairments due to the above mentioned synchronization errors are considered here. Symbols arriving at an antenna from different mobile stations actually do not arrive at the same instant of time, but exhibit a so-called time difference of arrival TDOA $\Delta\tau_d$, which are modeled in reduced form as discrete symbol timing offsets (STO), said symbol timing offsets being counted in samples exceeding the effective guard interval $N_{CP}-L$. Positioning the sampling window at antenna m such that it is optimal for the earliest arriving signal from the closest mobile station, i.e. the earliest arriving signal from the closest mobile station is fully covered by the sampling window, so the values of the symbol timing offsets show positive values only. The symbol timing offset on the link from mobile station k to antenna m is denoted $\mu^{m,k}=\lfloor\Delta\tau_d^{m,k}/T_s\rfloor$ counted sampling intervals $T_s$ larger than $N_{CP}-L$.

Similarly, the carrier frequency offset (CFO) on any link 120 {m,k} is described in normalized form, wherein the subcarrier spacing is $1/(QT_s)$ in order to arrive at a normalized frequency offset off $\epsilon^{m,k}=\Delta f_C^{m,k}QT_s$.

Both the TDOAs as well as the carrier frequency offset are detrimental to the orthogonality between subcarriers. Therefore, i.e. to account for these effects, the assumed linear transmission model for a transmitted symbol is extended to reflect the coupling of a subcarrier to other subcarriers within a current and a preceding symbol o−1. The received signal at antenna m and assuming a flat transmission channel, i.e. L=1, can thus be written as $$Y_{o,q}^m = \sum_{k=1}^{K}\left(H_q^{m,k} E_{o,q}^{m,k} X_{o,q}^k + \sum_{l=1,l\ne q}^{Q} H_q^{m,k} E_{o,l}^{m,k} X_{o,l}^k + \sum_{l=1}^{Q} H_q^{m,k} E_{o-q}^{m,k} X_{o-1,l}^k\right) + V_{o,q}^l \quad (2)$$

wherein subcarriers adjacent to the desired subcarrier q are denoted by index l and wherein subscript o−1 denotes the previous OFDM symbol.

As can be seen from (2) the asynchronous interference depends on the subcarrier coupling coefficients $E_{o,l}^{m,k}$ and $E_{o-1,l}^{m,k}$, which are equally weighted by the channel transfer function H and which for a current OFDM symbol are given by $$E_{o,l}^{m,k} = \begin{cases} 1 & \mu^{m,k}\le N_{CP} \wedge \varepsilon^{m,k}=0 \\ a^{m,k}/Q & \kappa^{m,k}=0, \mu^{m,k}>N_{CP} \\ \dfrac{1}{Q}e^{\frac{j\pi}{Q}\theta_o}\dfrac{\sin\left(\dfrac{\pi\kappa^{m,k}}{Q}a^{m,k}\right)}{\sin\left(\dfrac{\pi\kappa^{m,k}}{Q}\right)} & \mu^{m,k}>N_{CP}, \varepsilon^{m,k}\ne 0 \end{cases} \quad (3)$$

The coupling to a preceding OFDM symbol is $$E_{o-1,l}^{m,k} = \begin{cases} 0 & \mu^{m,k}\le N_{CP} \\ b^{m,k}/Q & \kappa^{m,k}=0, \mu^{m,k}>N_{CP} \\ \dfrac{1}{Q}e^{\frac{j\pi}{Q}\theta_{o-1}}\dfrac{\sin\left(\dfrac{\pi\kappa^{m,k}}{Q}b^{m,k}\right)}{\sin\left(\dfrac{\pi\kappa^{m,k}}{Q}\right)} & \mu^{m,k}>N_{CP}, \varepsilon^{m,k}\ne 0 \end{cases} \quad (4)$$

with reduced frequency distances $\kappa^{m,k}=\epsilon^{m,k}+l-q\,\forall q,l\epsilon[1,Q]$ and $\theta_o=2(oN_B+N_{CP})\epsilon^{m,k}+2\kappa^{m,k}(\mu^{m,k}-N_{CP})+\kappa m, k(N_B-\mu^{m,k}-1),$ and $\theta_{o-1}=2(oN_B+N_{CP})\epsilon^{m,k}+\kappa^{m,k}(\mu^{m,k}-N_{CP}-1)$ In case $\mu^{m,k}>N_{CP}$ the coefficients $a^{m,k}$ and $b^{m,k}$ are given as $a^{m,k}=N_B-\mu^{m,k}$ and $b^{m,k}=\mu^{m,k}-N_{CP}$ respectively.

If the link delay of a channel 120 does not exceed the guard interval, i.e. $\mu^{m,k}<N$, we have $a^{m,k}=b^{m,k}=Q$.

Equation (2) represents a receive signal at antenna m, wherein intercarrier and intersymbol interference terms are considered. To refer to these principal terms we use abbreviations $Z_{o,q}^{m,k}$, $Z_{o,l}^{m,k}$ and $Z_{o-1,l}^{m,k}$ to describe the coupling of between received symbols and transmitted symbols on a desired subcarrier q as well as all other subcarriers.

For frequency-selective channels the computation of the subcarrier coupling coefficients becomes more involved, since the decaying channel impulse response within the CP by evaluation of the linear convolution as well as the non-uniform weighting due to the channel transfer function needs to taken into account. For the general understanding of the following derivations it is sufficient to use Equation (2) as representative description of the additional intercarrier and intersymbol interference terms.

For estimating the vector of transmitted data $\underline{X}_{o,q}=[X_{o,q}^1 \ldots X_{o,q}^K]^T$ on subcarrier q the scalar received signals at antenna m as described in equation (2) are collected into a vector of received signals $\underline{Y}_{o,q}=[Y_{o,q}^1 \ldots Y_{o,q}^M]^T$, so equation (2) can be written in a more compact form as $$\underline{Y} = Z\underline{X} + \underbrace{\sum_{\forall l \in Q_q} Z_{o,l}\underline{X}_{o,l} + \sum_{\forall l \in Q} Z_{o-1,l}\underline{X}_{o-1,l}}_{\underline{U}} + \underline{V}. \quad (5)$$

Since the asynchronous interference is collected in vector U, indices {o,q} can be omitted. Moreover, an effective channel matrix Z replaces channel matrix H in the basic transmission model.

For estimating transmitted data, i.e. for computing an estimated symbol $\hat{X}^i$ transmitted by a user i, a linear estimation can be applied as is basically known from conventional systems as described for example in "Adaptive filters" by A.H. Sayed, Jon Wiley & Sons 2008. Consequently in one embodiment a vector of estimated symbols $\hat{X}$ is computed by minimizing the Euclidian norm, i.e. the vector of estimated symbols is $$\hat{\underline{X}} = \underset{\underline{X}}{\arg\min}\{\|\underline{Y} - Z\underline{X}\|_2^2\} \quad (6)$$

$$= \underbrace{(Z^H Z)^{-1} Z^H}_{G_{LS}} \underline{Y}$$

wherein $G_{LS}$ denotes least squares filter matrix. Note that a conventional least squares filter does not provide any particular advantage unless extended as described in the following to suppress the described asynchronous interference.

Alternatively, when treating vector $\underline{X}$ as random, a linear least mean-squares filter matrix $G_{LLMS}$ can be obtained by minimizing the expected mean-square error:

$$G_{LLMS} = \underset{G}{\arg\min}\{\mathbb{E}\{\|\underline{X} - G\underline{Y}\|_2^2\}\} \quad (7)$$

$$= (Z^H \Phi_{vv'}^{-1} Z + I)^{-1} Z^H \Phi_{vv'}^{-1}.$$

wherein the expectation is applied with respect to noise V and transmitted symbol X and the channel and impairments are considered fix, the transmit signals have unit power, and Z denotes the effective channel transfer matrix, and $\Phi_{vv'}$ denotes an effective noise covariance matrix $\Phi_{vv'}=\Phi_{uu}+\Phi_{vv}$, with $\Phi_{vv}$ representing white noise and $\Phi_{uu}$ denoting the matrix reflecting the interference of asynchronous interference, i.e. interference caused by carrier frequency offsets and TDOAs.

The asynchronous interference covariance matrix is defined as $$\Phi_{uu} = \mathbb{E}\{\underline{U}\,\underline{U}^H\} = \sum_{k=1}^{K}\left(\sum_{l=1, l\neq q}^{Q} |Z_{o,l}^k|^2 + \sum_{l=1}^{Q} |Z_{o-1,l}^k|^2\right) \quad (8)$$

wherein $Z^k$ denotes the k-th column of matrix Z.

As can be seen from equation (8) the noise covariance is no longer white, but colored.

The symbol estimate $\hat{X}^i$ for one desired user i can be obtained from the inner product between the i-th row of filter matrix G, i.e. $(G^i)^H$, with the vector of received signals $\underline{Y}$ as $\hat{X}^i=(G^i)^H\underline{Y}$, i.e. by applying a minimum mean-square error filter on the vector of received signals.

Equation (8) reveals that the asynchronous interference covariance matrix $\Phi_{uu}$ includes a number of $N_U=(2QK)-K$ contributions from different columns $Z_{o,l}^k$ of the effective channel matrix Z. Equations (3) and (4) reveal that the interference terms follow the sinc-function behaviour or the subcarrier spectra. This allows reducing the amount of necessary computations while at the same time sufficiently reducing the interference by considering only the dominantly contributing subcarriers when computing the filter matrix.

FIG. 2a depicts the cumulative inter channel interference (ICI) power $\beta_{cum}$ for a single link, i.e. for one link from a mobile station k to one antenna m of a base station, for increasing carrier frequency offsets, wherein the ICI power $\beta_{cum}$ is normalized to the maximum. The relative carrier frequency offset CFO with respect to the bandwidth of the OFDM subcarriers is denoted by $\epsilon$. In this simulation the DFT window length has been set to 512 and the length of the cyclic prefix has been set to 4.7 microseconds. This simulation illustrates that the subcarriers most adjacent to a desired subcarrier are the dominant interfering subcarriers, when considering carrier frequency offsets.

Figure 2B:
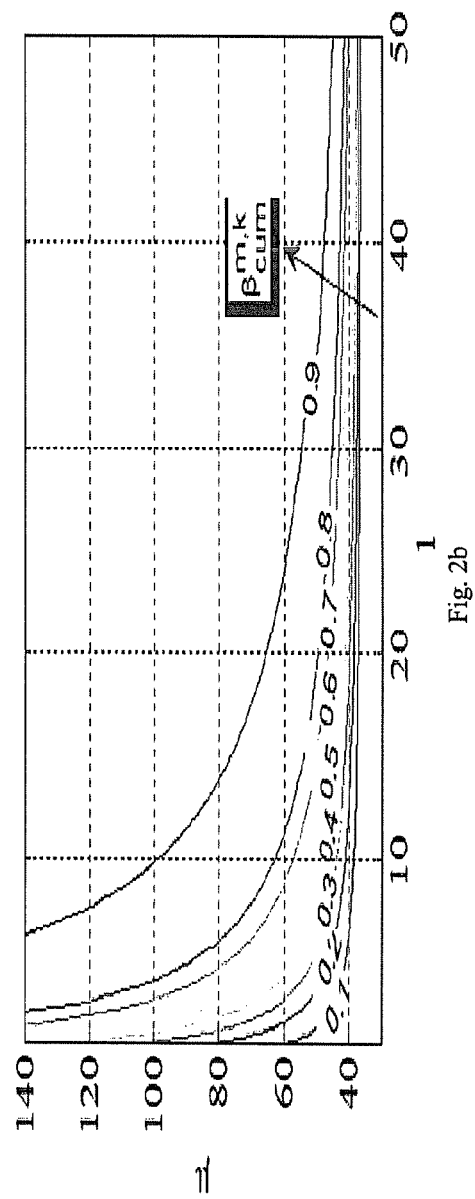

FIG. 2b illustrates the cumulative inter channel interference (ICI) $\beta_{cum}$ for increasing symbol timing offsets for one link, wherein $\mu$ represents the symbol timing offset in units of sample intervals. The DFT window length as well as the cyclic prefix length are the same as in FIG. 2a. The simulation illustrates that the subcarriers most adjacent to a desired subcarrier can be considered also as the dominant interfering subcarriers, when considering symbol timing offsets.

FIG. 3 depict the performance of the proposed processing in a coordinated multipoint communication system, wherein FIG. 3a depicts the mean signal to interference and noise ratio SINR after equalization by the proposed linear filter and filter matrix respectively. A flat channel and symmetric 2×2 user positioning, i.e. two mobile stations are positioned symmetrically to the receiving base stations, is assumed. Furthermore a multi-user power control is applied in order to achieve a target SNR of 25 dB with a maximum transmit power constraint per user.

The graphs reflect the SINR for one arbitrary subcarrier depending on the timing offsets, i.e. TDOA, denoted by $\Delta\tau_d$, in microseconds, wherein the graphs characterized by squares are simulated for a linear least-mean squares matrix, i.e. a MMSE filter, while the graphs indicated by circles reflect the performance of a least squares matrix, i.e. a zero-forcing filter. The performance of the filters has been simulated for a varying number of receive antennas $N_R=1/2/4$, as indicated by the arrow.

Figure 3B:
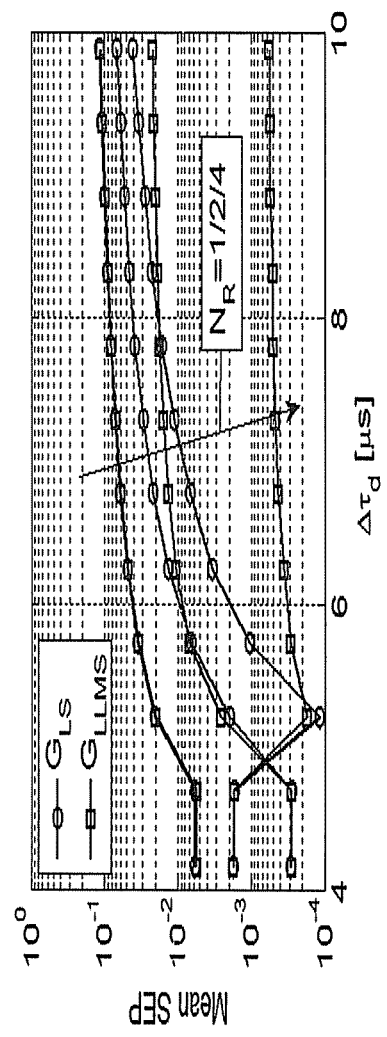

FIG. 3b depicts the simulated mean symbol error probability for the same setup as in FIG. 3a, wherein a 16QAM modulation, a maximum likelihood symbol decision and 5000 channel and noise realizations are assumed The graphs in FIG. 3a and FIG. 3b demonstrate that an increasing number of antennas improves the performance of each filter. Furthermore the simulations demonstrate that a MMSE filter in all cases outperforms a conventional zero-forcing filter which has a similar performance as an MMSE filter without asynchronous interference knowledge.

The invention claimed is:

1. Method for estimating symbols transmitted in a time and frequency asynchronous OFDM radio communication system, said system comprising a plurality $M_R$ of base stations, each base station equipped with a plurality $N_R$ of receive antennas,
   comprising the steps of
      receiving in the same time slot and on the same OFDM-subcarrier at each of the plurality of $N_R$ receive antennas of the $M_R$ base stations a plurality of K transmit symbols from a plurality of K single antenna mobile stations, wherein $M_R>=2$ and $N_R>=2$ and
      estimating the carrier frequency offset of each link, and
      estimating the symbol timing offset of each link, and
      estimating the channel transfer function of each link, and
      computing a filter matrix of a linear filter based on the estimated frequency offsets and based on the estimated symbol timing offsets and based on the channel transfer function, and—applying a linear filtering on at least one of the plurality of K transmit symbols to estimate the symbol, wherein said filtering implements the filter matrix.

2. Method for estimating symbols according to claim 1 wherein the linear filter is a minimum mean-square error filter.

3. Method for estimating symbols according to claim 1 wherein the linear filter is a zero forcing filter.

4. Method for estimating symbols according to claim 1 claim wherein a sampling window at each antenna is positioned to the earliest arriving signal from the closest mobile station.

5. Method for estimating symbols according to claim 1 wherein the steps of estimating the carrier frequency offset of each symbol and estimating the symbol timing offset of each received symbol are performed in the base station that received the respective symbol, and wherein said base station passes the estimated symbol timing offset and carrier frequency offset of each received symbol to a joint processing entity.

6. Method for estimating symbols according to claim 5 wherein the steps of computing the filter matrix and applying a linear filter are performed in the central processing entity.

7. Method for estimating symbols according to claim 5 further comprising the step of determining the strongest interfering subcarriers with respect to a desired symbol and considering the determined strongest interfering subcarriers only when computing the filter matrix.

8. An OFDM radio communication system comprising a plurality MR of base stations, each base station equipped with a plurality NR of receive antennas, said system being adapted and configured to perform the steps of
      receiving in the same time slot and on the same OFDM-subcarrier at each of the plurality NR of receive antennas of the MR base stations a plurality of K transmit symbols from a plurality of K single antenna mobile stations, wherein MR>=2 and NR>=2 and
      estimating the carrier frequency offset of each received symbol, and
      estimating the symbol timing offset of each received symbol, and
      computing a filter matrix of a linear filter based on the estimated frequency offsets and based on the estimated symbol timing offsets, and
      applying a linear filtering on at least one of the plurality of K transmit symbols to estimate the symbol, wherein said filtering implements the filter matrix.

9. The system of claim 8 wherein the linear filter is a minimum mean-square error filter.

10. The system of claim 8 wherein the linear filter is a zero forcing filter.

11. The system of claim 8 wherein a sampling window at each antenna is positioned to the earliest arriving signal from the closest mobile station.

12. The system of claim 8 wherein the steps of estimating the carrier frequency offset of each symbol and estimating the symbol timing offset of each received symbol are performed in the base station that received the respective symbol, and wherein said base station passes the estimated symbol timing offset and carrier frequency offset of each received symbol to a joint processing entity.

13. The system of claim 12 wherein the steps of computing the filter matrix and applying a linear filter are performed in at the central processing entity.

14. The system of claim 8 further adapted and configured to perform the step of determining the strongest interfering subcarriers with respect to a desired symbol and considering the determined strongest interfering subcarriers only when computing the filter matrix.

* * * * *